United States Patent [19]

Rajan et al.

[11] Patent Number: 5,085,918
[45] Date of Patent: Feb. 4, 1992

[54] PRINTED RETROREFLECTIVE SHEET

[75] Inventors: J. Sundar Rajan; Vincent J. Mako, both of St. Paul, Minn.

[73] Assignee: Minnesota Mining and Manufacturing Company, Saint Paul, Minn.

[21] Appl. No.: 524,147

[22] Filed: May 15, 1990

[51] Int. Cl.⁵ .............................................. B32B 9/00
[52] U.S. Cl. .................... 428/195; 428/204; 428/206; 428/411.1; 428/913; 428/916; 206/807; 313/5; 430/10
[58] Field of Search ............. 430/10; 383/5; 206/807; 428/411.1, 913, 916, 195, 204, 206

[56] References Cited

U.S. PATENT DOCUMENTS

| | | | |
|---|---|---|---|
| 2,681,473 | 6/1954 | Carlson | 18/61 |
| 3,679,612 | 7/1972 | Titow | 260/2 |
| 3,933,665 | 1/1976 | Van Engeland et al. | 252/62.18 |
| 4,511,210 | 4/1990 | Tung et al. | 350/105 |
| 4,644,966 | 5/1987 | Bailey et al. | 428/203 |
| 4,648,932 | 5/1987 | Bailey | 156/276 |
| 4,708,920 | 11/1987 | Orensteen et al. | 430/10 |
| 4,714,656 | 12/1987 | Bradshaw et al. | 430/10 |
| 4,758,952 | 7/1988 | Harris, Jr. et al. | 364/300 |
| 4,767,659 | 8/1988 | Bailey et al. | 428/203 |

OTHER PUBLICATIONS

3M Brand Multifunction Printer Model 1800 Operator's Guide.
3M Brochure for LBQ Printing System.
Schein, L. B., Electrphotography and Development Physics, pp. 58 and 60 ©Springer-Verlag Berlin Heidelberg 1988.

*Primary Examiner*—Patrick J. Ryan
*Attorney, Agent, or Firm*—Gary L. Griswold; Walter N. Kirn; Douglas B. Little

[57] ABSTRACT

A weather resistant sign and a method of printing a sign including the steps of providing a sign component and an image definition, applying dry toner powder to surface portions corresponding to the image definition, and fusing the applied toner. Preferably, the fused toner is protected from weather by a transparent protective layer. A toner composition and a computer program for printing are also disclosed.

7 Claims, 12 Drawing Sheets

PRINTED RETROREFLECTIVE SHEET

A microfiche appendix is included in this application showing certain computer software. The appendix comprises one microfiche with 73 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the production of signs, and in particular, to the printing of an image for a weather resistant sign such as a license plate.

Vehicle license plates are a challenging problem. They must provide an overall similarity of styling or appearance to enable rapid recognition of license plates issued by various licensing authorities and to inhibit counterfeiting. At the same time, license plates need to provide a distinct, individualized, and unique identifier code or image for each vehicle. In essence, each vehicle requires a custom, short run manufacturing process to incorporate its unique code or image upon a commonly styled license plate blank.

The best known manufacturing process for incorporating the unique image has been stamping or embossing a metallic plate to first provide raised letters or numbers on a plate. Subsequently, the raised letters or numbers are contacted by a liquid ink or paint carried upon a roller or pad. The liquid ink or paint dries to provide a contrasting image which corresponds to the embossed image or raised pattern of the plate. In order to improve the weather resistance, after drying of the ink, the plate is dipped in a liquid clear coating agent (i.e. a solvent born resin or plastic). The resulting plate is relatively durable. However, the embossing and inking process is labor intensive. In the U.S. most of the labor for this process has been prison labor. In other areas of the world, however, private industry or governmental employees are the labor sources for license plate manufacture.

In recent years, many licensing authorities have offered "vanity" license plates at a premium license fee. Such plates allow the licensee to participate in the selection of an attractive or meaningful printed design to be entered upon their license plates. Unfortunately, the production of such "vanity" license plates also entails a significantly greater production cost. Additionally, some licensing authorities desire to reuse previously abandoned identifying codes or images. Preparation of license plates for such nonsequential images also represents a custom manufacturing operation, similar to that required for "vanity" plates. A more versatile and efficient printing process would be useful for preparing regular, nonsequential, and vanity license plates.

Another aspect of the present embossing and liquid inking process is the release of solvent vapor from the drying ink. This solvent release is in addition to solvent released by the dipping and subsequent drying of the protective clear coating layer. The manufacture of large quantities of license plates requires substantial investment in drying ovens and solvent vapor ventilation. Increased scrutiny of possible environmental and health risks associated with various solvent vapors appears to be a trend throughout the world. It would be advantageous to eliminate the generation of solvent vapors from the process of printing license plates.

Many traffic signs and license plates have a retroreflective property which is generally considered desirable in the industry. In such cases, inks or paints have been selected for compatibility with the retroreflective materials. A more versatile and efficient printing process would accommodate a variety of colorants and be compatible with retroreflective components used in license plates and traffic signs.

SUMMARY OF THE INVENTION

The present invention includes a method of printing a weather resistant sign when provided with a sign component having a surface to be printed and a definition of the image to be printed. Dry toner powder is applied to portions of the surface corresponding to the image definition. The toner is fused to form a fused image upon the surface of the sign component. Preferably the surface, including the fused toner, is covered by a protective coating to seal the fused toner within a weather resistant package. The sign component to be printed may be an opaque or retroreflective sheet or, alternatively, a light transmitting (preferably transparent) cover film for use over an opaque or retroreflective sheet. The image definition may be mechanical, such as by embossing, or digital, such as by a computer generated signal from a stored image, an optically scanned image, an image stored on microfilm or an image composed by a computer operator. The method may be practiced without the generation of solvent vapors and is also suitable for other short runs of signs, such as street name signs.

The present invention also includes a license plate printed by the method of this invention. A license plate of the present invention is a laminate including at least the following layers: a substrate, a retroreflective sheet layer upon the substrate oriented to provide retroreflection of light entering the retroreflective sheet opposite from the side laminated to the substrate, and a discontinuous image layer of fused toner over the retroreflective sheet. A preferred license plate of the present invention is a laminate including at least the following layers: a substrate, a retroreflective sheet layer upon the substrate oriented to provide retroreflection of light entering the retroreflective sheet opposite from the side laminated to the substrate, a transparent protective top layer over the retroreflective sheet layer, and a discontinuous image layer of fused toner sandwiched between the retroreflective sheet layer and the transparent top layer. The license plates optionally may include an embossed image substantially corresponding to the fused toner.

DETAILED DESCRIPTION OF THE PREFERRED EMBODIMENTS

The present invention includes a method of printing a weather resistant sign. The method includes the steps of providing a first sign component having a surface, providing a definition of an image or graphic which is to be printed upon the surface of the first sign component, applying dry toner powder to portions of the surface which correspond to the definition of the image to be printed, and fusing the applied dry toner powder to form a fixed image upon the sign component surface. These steps are explained in greater detail in the following detailed description of the preferred embodiments. Additionally, the invention preferably further includes the step of covering the surface and fused toner with a light-transmitting material to seal or sandwich the fused toner within a weather resistant package.

The invention will be explained with respect to the production of an automotive license plate; however, the printing method is also suited to the production of other signs and particularly to highway or outdoor signs which are produced in very limited numbers. One particular appropriate sign to be printed by the method of the present invention is a street name sign.

Figure 1:
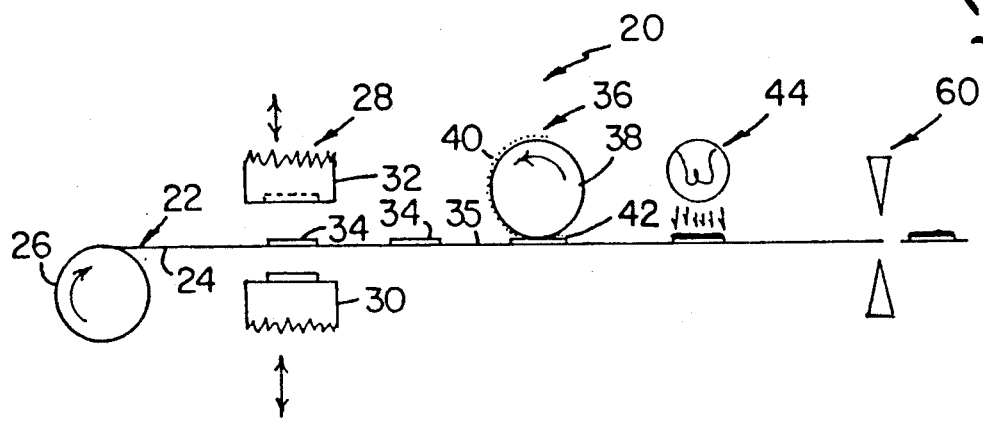
FIG. 1 is a schematic of an embodiment of the present invention employing a mechanically defined image.

In a first embodiment, a method for producing an embossed sign is shown schematically in FIG. 1. A sign component 22 is provided. Preferably, the sign component 22, is a thin piece of embossable material, for example, a web 24 from a roll 26 of aluminum. A thickness of about 0.8 mm is suitable for aluminum license plates. In a most preferred embodiment, the aluminum web may include a facing layer of retroreflective sheeting. Such retroreflecting sheeting is known in the sign art. Enclosed lens retroreflective sheetings and the use of glass beads to provide for reflexed light reflectors are described in Palmquist, et al., U.S. Pat. No. 2,407,680; May, U.S. Pat. No. 4,626,127; Tung et al., U.S. Pat. No. 4,367,920; Tung et al., U.S. Pat. No. 4,511,210; and Tung et al. U.S. Pat. No. 4,569,920; Bailey et al., U.S. Pat. No. 4,767,659; Bailey et al. U.S. Pat. No. 4,664,966; and Bailey, U.S. Pat. No. 4,648,932; the disclosures of which are incorporated by reference herein.

Generally, enclosed lens retroreflective sheetings include, in order, an adhesive layer for application to a support such as a license plate blank, a specular reflective surface, a light transmitting spacing layer, and a monolayer of glass beads within a light transmitting resin layer. Often, a protective outer layer or top layer is also present. Retroreflective sheeting typically functions in the following manner: Light from an external source, is transmitted to the beads, which serve as lenses and direct the light toward the specular reflective surface, through the spacing. The reflective surface, preferably cupped about each of the glass beads, returns the light to the glass beads which in turn return the light toward the source.

The sign component 22 is embossed in an embossing unit 28. Embossing units are well known in the production of license plates and typically include a male 30 and female 32 embossing molds or dies. When the embossing dies 30 and 32 are pressed together with the sign component interposed, a raised portion 34 is formed upon the sign component 22. These die pairs are interchangeable members of a set of dies and generally allow alphanumeric designs or images to be defined. Typically, the raised or embossed portion 34 protrudes about 0.15-0.20 cm relative to the unaltered portions of the surface. If a retroreflective sheeting element is included upon the sign component 22, the retroreflective sheeting would be on the face of the sign component, overlying the raised portion 34 and arranged to provide a retroreflection property to the surface to be printed.

Next, a printer unit 36 applies a dry toner powder to the raised portion 34. Sign component 22 may be heated to facilitate transfer of toner. The printer 36 is configured so as to avoid application of the dry toner powder to the unraised portion of the sign component 22. An appropriate application system within the printer unit 36 includes a rotating drum 38 carrying a layer 40 of dry toner powder. The rotating drum 38 contacts or nearly contacts the raised portion 34 of the sign component 22. The contact or near contact between the rotating drum 38 and the raised portion 34 allows a transfer of at least a portion of the layer 40 of dry toner powder onto the raised portion 34, without transferring dry toner onto the unaltered portions (i.e. portions not embossed or in relief) of the surface 35 of the sign component 22. The transfer of dry toner powder may be facilitated by warming of the embossed sign component 22. In the first embodiment, when the drum 38 is not an electrostatic drum, a charge carrier is unnecessary in the dry toner powder. For example, a hard rubber roller adequately carries toner powder for transfer to embossed portions of a license plate blank.

Next, the applied dry toner powder 42 upon the raised portion 34 is fused. The fusing step may be by means of infrared heating 44 or other suitable means of supplying an amount of heat sufficient to raise the temperature of the dry toner powder to melt a binder component within the dry toner powder. Fusing serves to fix the image on the raised portions. The resulting product may now be cut and used as a license plate or a sign at cutter 60.

Preferably, the fused dry toner is covered to protect it from weathering. One method of covering is the well known "dip coating" method currently employed for covering license plates. An alternative means of covering is the lamination of a protective film which may be supplied in roll form. The web of protective film is brought into close proximity to the surface and raised portions of the sign component, for example, by a guide roller. A set of pinch rollers provide a nip for pressing the protective film over the raised portions 34 having fused toner and also onto unraised surface 35. The application of the protective film seals the fused toner between the sign component 22 (optionally having a retroreflective sheet on its face) and protective film. Lamination of a protective film coat, such as an oriented polyalkylmethacrylate coated with a thin layer of pressure-sensitive acrylate adhesive, may also be employed as a combination fusing and covering step. Appropriate temperatures serve to both fuse and laminate but are less than temperatures which alter the orientation of the cover film.

The embossing unit 28 in the first method 20 serves to define a raised image upon the sign component 22. Traditionally, matching male 30 and female 32 dies must be employed to provide a particular definition of an image. In the schematic of FIG. 1, such a defined image is represented by the raised portion 34. Because license plates are prepared in extremely small groups (i.e. one or two plates per vehicle) and require distinct images for each vehicle, a change is required in the embossing unit 28 after every one or alternatively two license plates has been embossed. The first method has the feature that a license plate may be prepared without the generation of any solvent vapors. The method could be substituted in the traditional manufacture of license plates. Such a substitution, however, would not eliminate the production of a solvent vapor from the clear dipping process.

Protective films which may have acceptable amounts of stretch or elongation have been disclosed in Bailey et al. U.S. Pat. No. 4,664,966 and U.S. Pat. No. 4,767,659, the disclosures of which are incorporated by reference herein. The method of the first embodiment is also suitable for printing on an embossed sign lacking retroreflective sheeting. License plates with retroreflective sheeting, however, are particularly desired by the industry.

Figure 2:
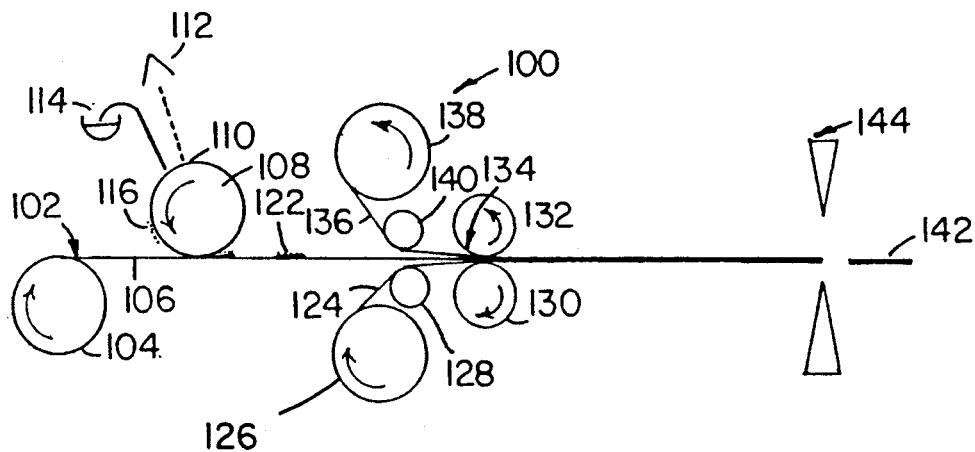
FIG. 2 is a schematic of an embodiment of the present invention employing a digitally defined image.

In another embodiment, a method 100 of printing a license plate independent of an embossing requirement is schematically shown in FIG. 2. In the method 100, a retroreflective sheeting 102 is provided as a roll 104, and a web 106. The web 106 contacts or nearly contacts a rotating drum 108. The surface 110 of the drum 108 is a reusable surface which is initially electrostatically charged. The electrostatic charging is altered by a laser imaging device 112 so as to form a latent image and to allow acceptance of dry toner powder from a reservoir 114. The rotating drum reusable surface 110 carries portions of dry toner powder 116 in an arrangement or pattern corresponding to a desired image definition transferred to the reusable surface 110 by means of the laser imaging device 112. The dry toner portions 116 carried upon the reusable surface 110 of the rotating drum 108 are brought into contact with and transferred to the retroreflective sheeting web 106, thereby applying dry toner powder to portions of the surface of the web 106 corresponding to the definition of the desired image. (The reusable surface 110 remains with drum 108 for use in transferring new images to subsequent portions of the web 106.)

The dry applied toner powder is next fused by the application of heat, for example, by a heating roller or infrared radiation. After the fusing operation, the retroreflective sheeting web 106 carries fused toner 122 on its surface as an image corresponding to the originally defined image supplied to the printer.

Next, the retroreflective sheeting is laminated to a web 124 of support material, for example, 0.8 mm thick aluminum, from a roll 126. This support material is brought into close proximity to the retroreflective sheeting web 106 by a roller 128 and laminated by a pair of rollers 130 and 132 forming a nip 134. Preferably, a protective transparent cover sheet provided as a web 136 from a roll 138 is brought into close proximity by a control roller 140 and is simultaneously laminated at the nip 134. As a final step, the license plate 142 is cut by a cutting device 144.

Optionally, a rim embossing or debossing step may also occur subsequent to lamination at the nip 134. Such rim embossing or debossing serves to stiffen and further reinforce the resulting license plate 142. However, embossing or debossing is not required for printing by the method 100 of this embodiment.

In a preferred embodiment, the fusing of the toner powder occurs simultaneously with the lamination step, the appropriate temperature being produced as part of the lamination step. In such an embodiment, the heat and temperature may be provided by heated rollers 130 and 132 forming the nip 134.

A feature of the embodiment 100 is that license plates may be produced without the generation of any solvent vapors. In the past, solvent vapors have typically been generated by the various solvent based inks, dies or paints used to produce an image. An additional feature of the method 100 is that the image is defined electronically or digitally, rather than by mechanical definition as in the method 20 described in FIG. 1. The method 100, therefore, is particularly efficient in providing short runs, such as, for example, one or two license plate images, since male and female dies do not have to be changed or adjusted after each extremely short run of license plates. Further, the range of available images is not limited to those defined by a set of mechanical dies, but rather is limited only to images which may be digitally defined. Typically, a wider range of images can be defined digitally rather than mechanically. Such digital images can also be changed faster and with reduced labor.

In this and other embodiments of the present invention, reusable surface 110 may be alternatively supplied by a belt surface or other well known means for accepting a latent image, accepting dry toner powder according to the latent image, and subsequently transferring the dry toner powder to a surface to be printed.

Figure 3:
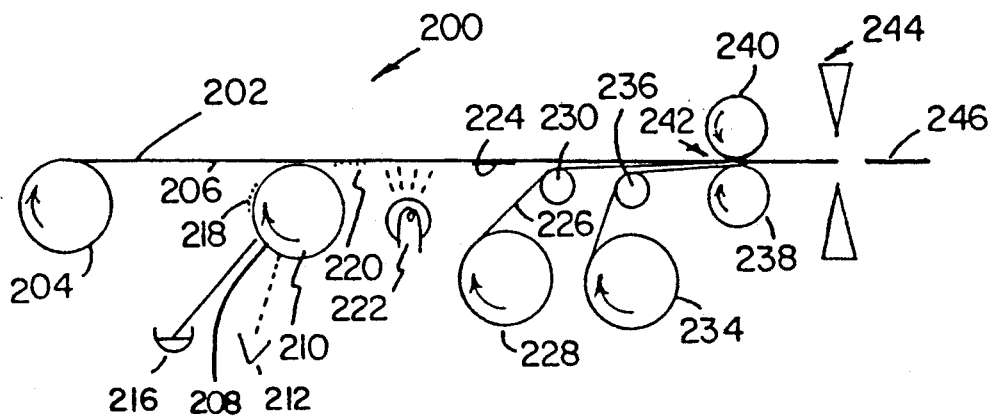
FIG. 3 is a schematic of another embodiment employing a digitally defined image.

In another embodiment of the present invention, another method 200 of printing an image without requiring embossing is schematically shown in FIG. 3. A web of a light transmitting protective sheet 202, preferably provided as a roll 204 has a surface 206 desired to be printed and to be laminated against a retroreflective sheet in the final product. The surface 206 contacts an electrostatic surface 208 of a rotating drum 210. The surface 208 has been initially electrostatically charged. The charge is altered by a laser imaging apparatus 212, connected to a digital image definition mechanism (not shown). The laser 212 alters the electrostatic charge on portions of the surface 208 such that imaging apparatus dry toner powder from a reservoir 216 is accepted by the surface 208 in discrete areas corresponding to the image definition. The discrete portions 218 of dry toner corresponding to the image definitions are next applied to the surface 206 of the protective cover sheet 202 as it contacts the rotating drum 210. The thus applied dry toner powder adheres to the surface 206 in portions of the surface 206 corresponding to the image definition provided by the digital image definition mechanism. The applied dry toner powder 220 is next fused in a heating mechanism 222 to form a fixed image 224 borne upon the sign component surface 206.

Subsequently, a retroreflective sheeting web 226 provided by a roll 228 is brought into close proximity to the surface 206 by a guide roller 230. Preferably a support web, for example provided by a roll of aluminum 234, is also brought into close proximity to the opposite side of the retroreflective sheeting 226 by a roller 236. Next, a pair of rollers 238 and 240 provide a nip 242 forcing the three webs into a lamination. Subsequently, the resulting lamination may be cut into license plates 246 by a common cutter 244. Optionally and preferably, the rim of the license plate 246 may be rim embossed or rim debossed subsequent to passage through the nip 242 to provide additional strength to the license plate 246.

As in the method 100 of FIG. 2, the method 200 of FIG. 3 is free from the generation of solvent vapors and includes the feature of versatility and efficient printing of short runs.

Also, as in method 100, the method 200 may alternatively and preferably combine the fusing and lamination into a single simultaneous operation by the use of heated rollers 238 and 240 at the nip 242. Alternatively, a partial fusing step may be employed initially, to improve handling and reduce any tendency of smearing of dry toner, after application to the web but prior to final fusing during lamination.

Figure 4:
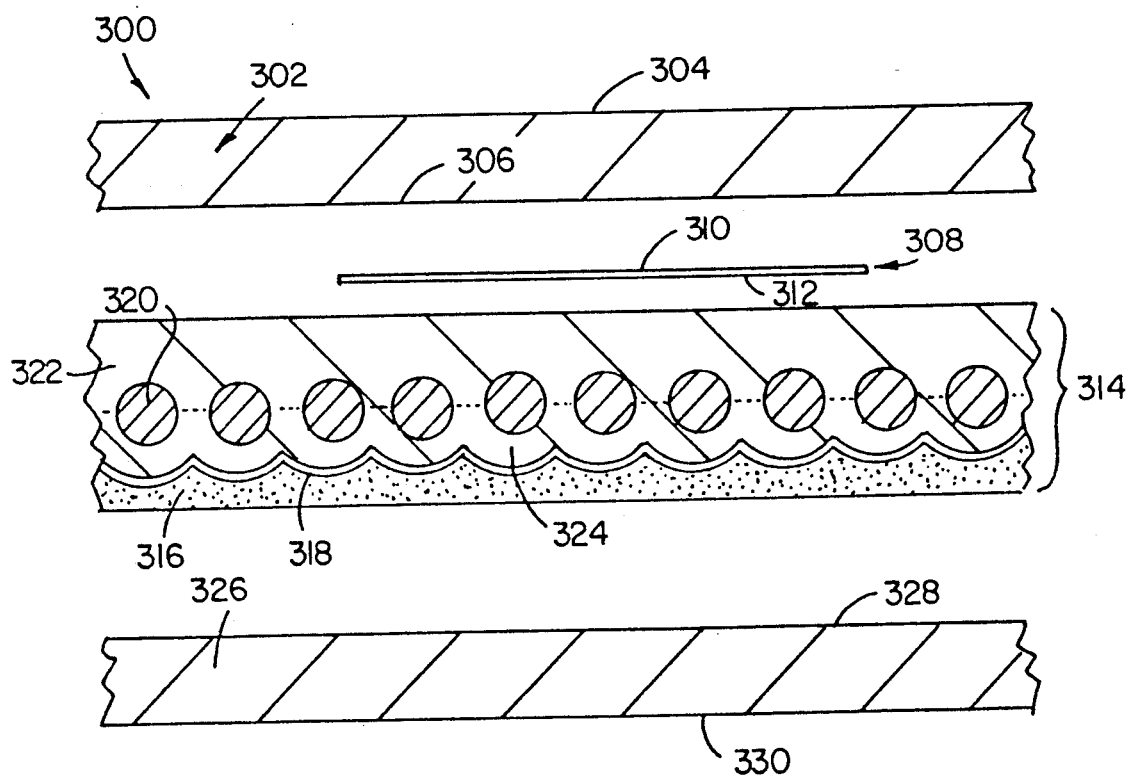
FIG. 4 is a partial cross section of a license plate of the present invention.

A preferred embodiment of a sign of the present invention is shown in exploded cross section in FIG. 4 at 300. The sign 300 includes an optional top protective layer 302 having a first or outermost surface 304 and a second or inner surface 306. The optional top protective layer 302 is located on the side of the sign 300 which is to be viewed and is preferably substantially transparent. Progressing through the sign 300 from the viewing side, the next layer is the discontinuous image layer 308, which is formed of fused dry toner powder. The image layer 308 has a first or outwardly directed surface 310 and a second or inwardly directed surface 312. Progressing through the sign 300, the next layer is a retroreflective sheet layer 314. In FIG. 4, the retroreflective sheet layer 314 is shown as an enclosed lens type retroreflective sheet and is oriented to be retroreflective to light entering from the direction of the optional top protective layer 302. Such sheets 314 preferably include a lower adhesive layer 316, a specular reflective layer 318, a transparent spacer layer 324, a monolayer of lenses 320, and a transparent upper layer 322. Enclosed lens retroreflective sheets have been previously described in Bailey et al. in U.S. Pat. No. 4,664,966, incorporated by reference herein. Below the retroreflective sheet 314 is a supporting substrate sheet 326, having an upper surface 328 and a lower surface 330. A preferred substate is aluminum, however, steel, wood or plywood, or various plastic sheets may be suitable alternatives.

In finished form, the layers 302, 308, 314, and 326 of the sign 300 are laminated together, such that light entering the sign 300 through the top protective layer 302 and not encountering the discontinuous image layer 308 is retroreflected by the retroreflective sheet 314 to pass back out though the top protective layer 302. Because the light is retroreflected, it generally returned along or near to its original pathway. By comparison, light entering the sign 300 through the top protective layer 302 and encountering the discontinuous image layer 308 is affected differently. If the discontinuous image layer is opaque, it will either absorb the light or reflect (but not retroreflect) the light back through the top layer at generally a range of new angles. If the discontinuous image is transmissive to some wavelengths of light and absorptive to other wavelengths, the transmitted wavelengths will pass though to the retroreflective layer 314 for retroreflection back along the original pathway. When viewed, such light transmissive colored images 308 will provide a colored light image suitable for conveying information to an observer.

Preferred solid toners have the following characteristics: resistance to degradation by weathering; and good adhesion to the substrate to which they are applied. A dry toner powder suitable for practicing the present invention requires a colorant and a binding agent. If the toner is to be applied by an electrostatic drum surface, a charge carrier should also be included within the toner.

A suitable binding agent may be an alkyl substituted acrylate or methacrylate polymer, with alkyl groups having from 1 to 9 carbon atoms, or mixtures of such acrylates, and especially a copolymer of methyl and butyl methacrylates (such as for example, Acryloid B-66 available from Rohm & Haas Company). Other suitable binding agents are polyvinyl acetals, for example, polyvinyl butryal (such as BUTVAR brand polyvinyl butryals B-90 or B-72 available from the Monsanto Chemical Company); polyolefins; polyesters (such as VITEL brand PE-200D from the Goodyear Tire & Rubber Company or ARAKOTE 3000 brand carboxyl terminated polyester optionally in mixture with ARALDITE PT810 brand polyfunctional epoxy resin (triglycidyl isocyanurate) both available from the Ciba-Geigy Chemical Company); and vinyl resins (such as VINYLITE brand vinyl resin, VAGH copolymer of vinyl chloride and vinyl acetate available from the Union Carbide Corporation).

The preferred binding agents are characterized by relatively high transparency and clarity. Additionally, preferred binding agents have glass transition temperatures ($T_g$) from about $-15°$ C. to about $150°$ C., preferably from about $35°$ C. to about $110°$ C., and most preferably about $50°$ C. The most preferred binding agents are chosen based upon their potential strong chemical interactions with the surface to be printed. Specifically envisioned as factors to be considered as providing the potential for strong chemical interactions are the likelihood of formation of bonds such as ionic or covalent bonds, donor-acceptor bonds, as well as secondary bonds such as hydrogen bonds and van der Waals bonds between the binding agent and the surface to be printed. In evaluating the potential, the relevant bond energies may be obtained from textbooks such as *Adhesion and Adhesives: Science and Technology* by A. J. Kinloch; 1987, University Press Cambridge, Great Britain.

Additionally, the most preferred binding agents can be laminated, when incorporated in a dry toner powder, at temperatures of from about $50°$ C. to about $240°$ C., preferably at temperatures of from about $120°$ C. to about $200°$ C. For example, the well known REFLECTO-LITE brand retroreflective sheeting available from the Minnesota Mining and Manufacturing Company of St. Paul, Minn., has a polyvinyl butyral surface and therefore compatible binding agents, which cause dry toner powders to laminate at temperatures from about $50°$ C. to about $240°$ C., may be fused during lamination of an ethylene acrylic acid (EAA) copolymer protective film to the retroreflective sheeting. Laminating temperatures refer to those measurable at the surface of rollers 132 and 240 in FIGS. 2 and 3 respectively. Temperatures at surfaces such as 102 in FIG. 2 or 202 in FIG. 3 may be lower than the laminating temperatures mentioned here. Most preferred are binding agents which may be used at temperatures of about $150°$ C.

Preferred binding agents are also resistant to ultraviolet (UV) light degradation and are adhesive to the surface upon which the toner is printed.

Suitable charge carriers may be positive charge control agents designed for use as additives in dry toner formulations such as, for example, copolymers of butyl and methyl methacrylate (such as TRIBLOX PC-100 brand acrylic polymer (available from E. I. DuPont de Nemours Company)). Polyesters and vinyl resins may also be used as charge carriers. A preferred acrylic copolymer charge carrier has the following characteristics: molecular weight of 2000 to 5000; glass transition temperature (Tg) of 53° C. to 59° C., onset at about 46° C., nitrogen content of about 1% as measured by NMR. Preferred charge carriers are also relatively light transmissive or transparent materials, and are resistant to UV light degradation. For a black toner, a transparent charge carrier is not essential. For example, an azine dye (Nigrosine Solvent Black 7, CI#50415:1) available from the Orient Chemical Company, port Newark, N.J., may be used as a charge carrier for such a toner. The most preferred charge carriers are acrylic polymers (i.e. alkyl acrylates or alkyl methacrylates) having amine functionality (i.e. functional groups including amine nitrogen or quaternary ammonium nitrogen).

Suitable colorants may be pigments such as Pigment Red 179 or 224 available from the Harmon-Mobay Chemical Company; Pigment Yellow 110 or Pigment Violet 37 available from the Ciba-Geigy Company; Pigment Green 7 or 36 available from the Sun Chemical Company; Pigment Blue 15;1 or Blue 15;6 available from BASF; and Regal 500R carbon black available from the Cabot Corporation. Suitable colorants may also be dyes such as Amaplast Yellow available from the Color-Chem International Corporation or LATYL Brilliant Blue BGA available from the DuPont Company. Generally, pigments or dyes should be resistant to environmental pollutant chemical degradation and UV light degradation. Preferably, pigments are dispersed in a dispersing resin, for example Red 229 dispersed in Vinylite VAGH resin in a 1:1 weight ratio. Such dispersion helps to maintain the small pigment particle size that is desired for obtaining a light transmittant image.

The fused toner image on retroreflective signs is preferably light transmissive for all colors except black. That is at least 10% of light entering the image area passes through the toner, except in the case of carbon black. In the case, however, of black images resulting from the use of carbon black, the fused toner image is preferably opaque. That is, none of the light entering the black image area passes through the toner.

Suitable dry powder toners may be prepared by combining from about 64% by weight to about 98% by weight binding agent with about 1% by weight to about 20% by weight charge carrier agent and with about 1% by weight to about 16% by weight colorant; preferably combining from about 76% by weight to about 92% by weight binding agent with about 2% by weight to about 12% by weight charge carrier agent and with about 6% by weight to about 12% by weight colorant; and most preferably combining about 88% by weight binding agent with about 4% by weight charge carrier agent and about 8% by weight colorant.

The binding agent, charge carrier agent and colorant may be mechanically mixed (and the binding agent as well as the charge carrier melted) using a twin screw extruder such as a variable speed twin screw extruder, for example a Baker Perkins gear drive model having a Haake rheocord torque rheometer. Preferably, the twin screw extruder generates a temperature of approximately 150° C. to approximately 225° C. during extrusion. The extruded product may be hammer milled and then jet milled to generate a mixture having particle sizes ranging from about 5 to about 100 micrometers, preferably from about 5 to about 50 micrometers and most preferably from about 5 to about 20 micrometers. A suitable jet mill is a NPA Supersonic Jetmill model PJM IDS-2 available from the Nippon Pneumatic Manufacturing Company. The resulting material may be used in the toner hopper of a laser type printer.

Suitable surfaces of sign components to be printed may be made from materials including polymers selected from the group consisting of polyalkylacrylates, polyalkylmethacrylates, polyesters, vinyl polymers, polyurethanes, cellulose esters, fluoropolymers, polycarbonates, polyolefins, ionomeric copolymers and copolymers of ethylene or propylene with acrylic acid, methacrylic acid, or vinyl acetate. Suitable retroreflective sheetings include SCOTCH-LITE brand HIGH INTENSITY retroreflective sheeting and REFLECTO-LITE brand retroreflective sheeting. The surface layers may be made of polyalkylacrylates or polyalkylmethacrylates (especially polymethyl methacrylate (PMMA)), polyesters, vinyl polymers and polyvinyl acetals such as, for example, polyvinyl butryals. The SCOTCH-LITE brand and REFLECTO-LITE brand retroreflective sheetings are available from the Minnesota Mining and Manufacturing Company of St. Paul, Minn.

A wide range of electrophotographic printers may be used to practice the present invention. One suitable printer is a 3M brand Multifunction Printer Model 1800 available from the Minnesota Mining and Manufacturing Company of St. Paul, Minn. The Model 1800 printer was originally designed for automatic paper-feed, but may be operated on continuous webs with modifications which are within the skill of the art. The dry powder toner of the present invention is substituted for the toner usually used with the printer. The Model 1800 printer is a dual-mode printer. The printer is capable of printing from 35 mm aperture cards or microfilm. The printer also accepts digital information from a host computer (such as a Sun Microsystems Computer) in the form of raster files. Another suitable printer is a 3M brand Model 679 LBQ LASER PRINTER available from the Minnesota Mining and Manufacturing Company of St. Paul, Minn. Preferably, such a printer is used in conjunction with a 3M brand Model 1811 CONTROLLER, also available from the Minnesota Mining and Manufacturing Company. Both of these printers are capable of 200 dots per inch (dpi) (i.e. 79 dots per centimeter or 3.95 line pairs per millimeter) horizontal and vertical resolution and accept raster data files either from a raster-based host system (such as a Sun Microsystems Computer) or vector-based host system through a vector-to-raster converter.

DESCRIPTION OF COMPUTER PROGRAM

A preferred computer program for defining license plate images which is written in the "C" computer language for use on a Sun Microsystems Computer is included on microfiche with this description. Standard computer programs for defining an image to be printed, in the form of raster files, are well known. However, many of these programs tend to suffer from a lack of speed in defining an image and/or tend to produce images with unacceptably "rough" edges when enlarged to sizes typically employed for an alpha numeric image on a license plate (i.e. about 6.0 cm in height). For example, Artisan ™, a graphics printing program available from Media Logic, Inc. of Santa Monica, Calif. and SunDraw ™, a graphics printing program available from Sun Microsystems, Inc. of Mountain View, Calif., each provide one bit raster character files having only about 20% of the resolution of the program of this invention.

The preferred computer program is capable of utilizing the best resolution of the printer, that is 200 dots per inch (i.e. about 7.9 dots per millimeter or 3.95 dots per millimeter). The program also provides a number of "prompting screens" to a video monitor to enable an operator to compose and review an image for alpha numeric identification on a license plate. The images are reviewed in reduced or downsized form to enable the image for an entire plate to be reviewed on a video monitor.

Figure 5:
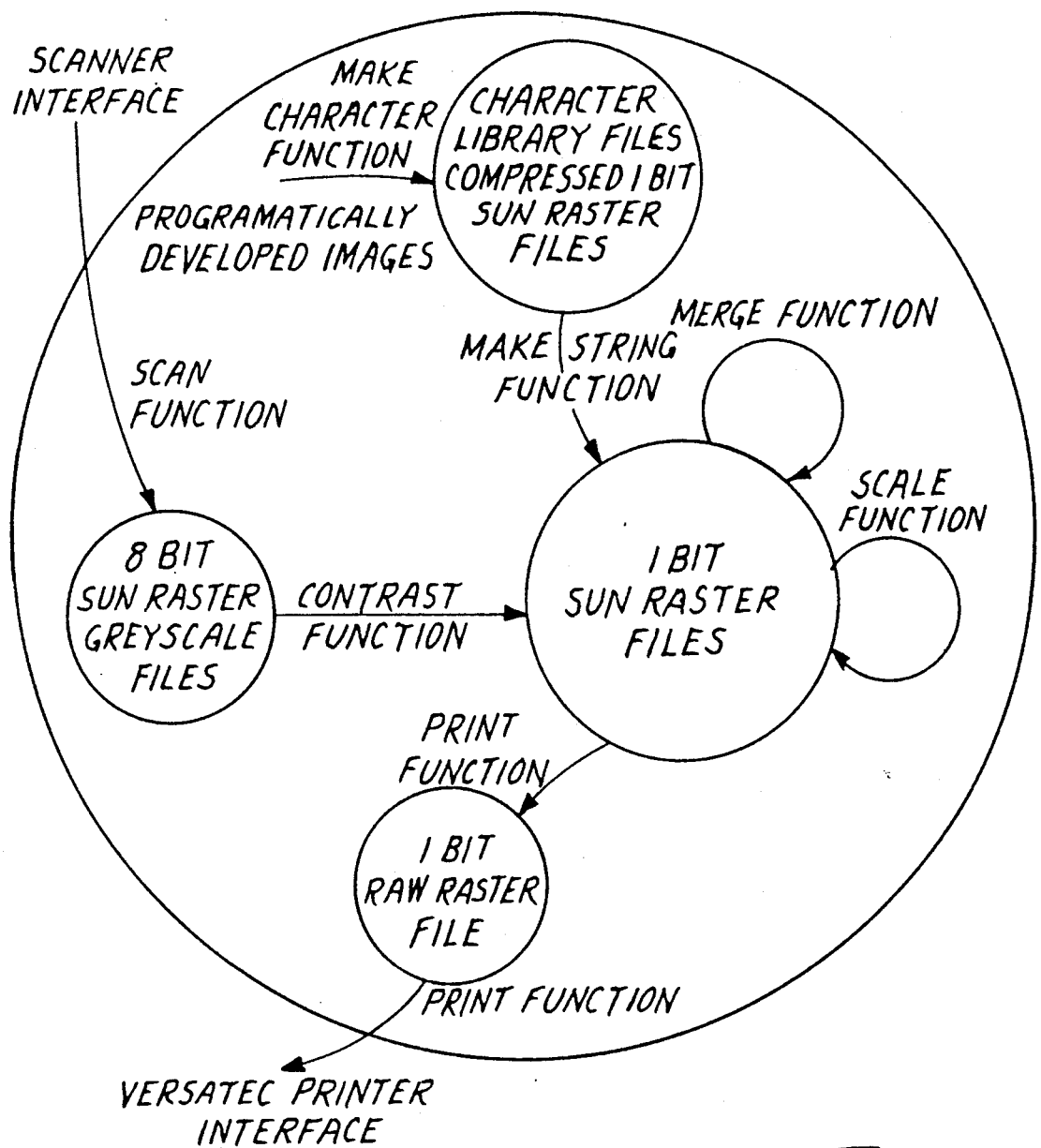
FIG. 5 is a diagram of the data flow within the preferred computer program of the present invention.
Figure 6:
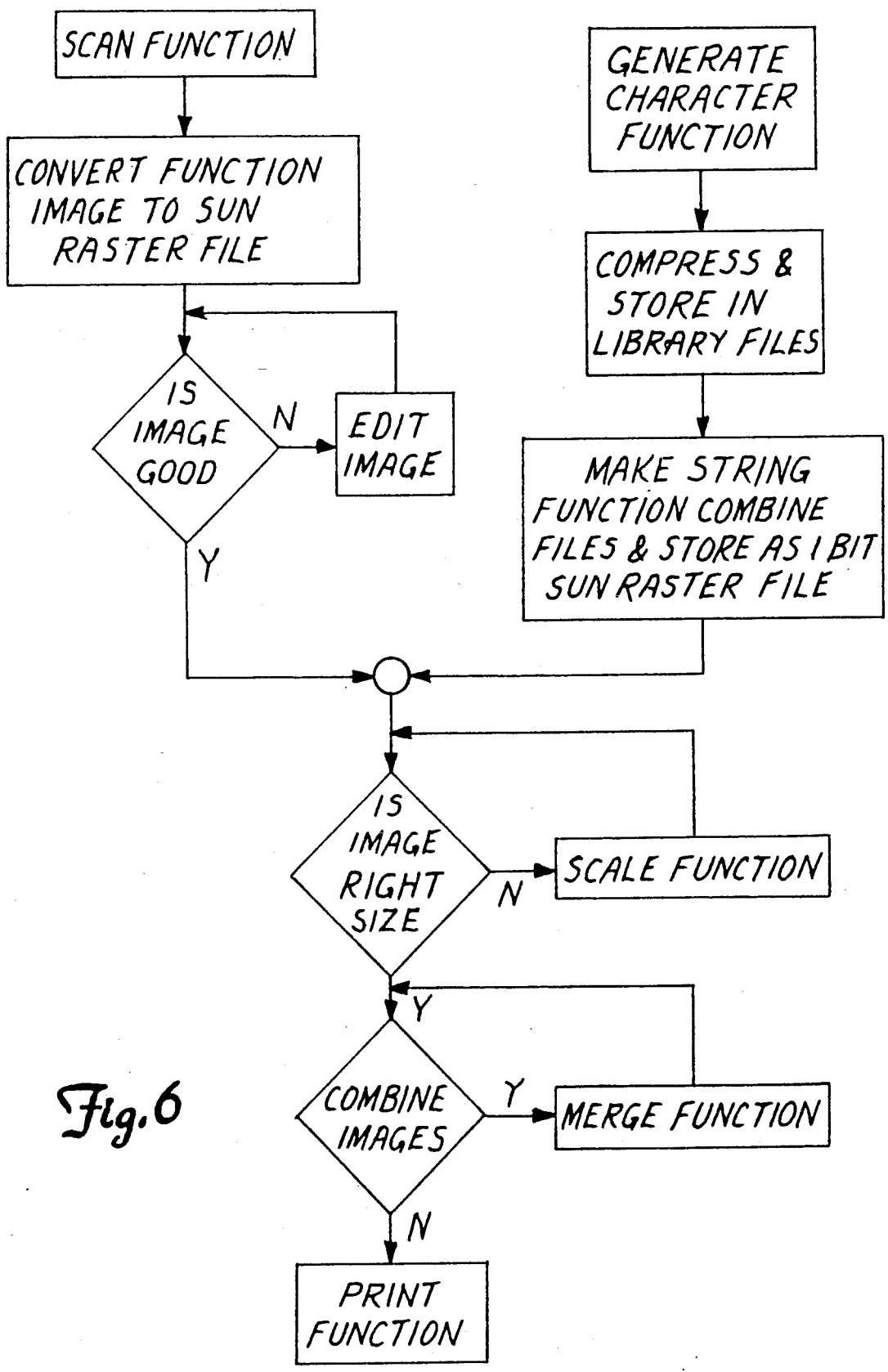
FIG. 6 is a process control flow chart for the preferred computer program of the present invention.

The computer program of the present invention may be generally understood by reference to the overview of FIGS. 5 and 6. In the following description, two forms of raster files are mentioned: raw raster files and Sun raster files. By "raw raster files" is meant raster files having a specific identifying header for recognition and processing compatibility within the program of this invention. Those skilled in the art will recognize that many alternative identifying header types could be used to render raster file data structures internally consistent within a program.

FIG. 5 shows an overall data flow pattern associated with program. The data initially supplied to the computer operating the program may be provided either as an eye readable image, such as an image on paper which may be optically scanned and entered at the scanner interface or alternatively, the image may be programmatically developed, such as the alpha numeric characters generated for license plates.

From the scanner interface, the scan function acts on the input image and converts it into an 8-bit Sun raster file which includes grey scale information. The contrast function converts the 8-bit raster file into a 1-bit Sun raster file which is in black and white form.

The data for defining an image may also be provided by using the character function. Data generated by the character function is stored in a character library file. The makestring function is used to combine a plurality of files of individual characters from the character library, then act upon the combined data and converts it to a 1-bit Sun raster file. Once an image is available as a 1-bit Sun raster file format, either the merge function and/or the scale function may be used to enhance or modify the final image. A 1-bit Sun raster file may be converted by the print function into a 1-bit raw raster file and then sent to the printer, via a Versatec printer interface, for conversion from raster form into a laser written latent image on a reusable drum surface. As explained earlier, portions of dry toner powder are accepted by the latent image portions of the reusable surface and subsequently transferred to the polymeric surface to be printed.

In the data flow diagram of FIG. 5, the large outside circle represents all of the program or software of this invention within the computer. The four smaller circles represents classes of files, such as 8-bit Sun raster files, compressed 1-bit Sun raster files, 1-bit Sun raster files (uncompressed) and 1-bit raw raster files. Within the class of 1-bit Sun raster files, several types may occur. For example, a 1-bit Sun raster file might be a file resulting from a scanned image, a programmatically developed image, such as a single alpha numeric character, a file resulting from operation of the merge function on a pre-existing 1-bit Sun raster file, or a file resulting from operation of the scale function on a pre-existing 1-bit Sun raster file. Files may be reviewed through the printing process or by well known screen preview programs. The 1-bit Sun raster files have a 36 byte header which indicate the data length of the file, the raster line length and the height, and the number of lines per image. A 1-bit raw raster file by comparison, has to be predefined for the printer. The print function requires files with a header including the definition of the line width, typically pre-defined as 400 bytes per line.

As shown in FIG. 6, a process control flow chart shows the major logical flow of the program through all the functions. Beginning with the scan function, an image file is converted from a grey scale to a 1-bit Sun raster file using the contrast function. A user may review and confirm that an image file corresponds to the desired image. If not, the user may edit that image file or rescan the image. A user may repeat this sequence until the image is acceptable. An acceptable image is purely subjective to the user, however, for a typical license plate, an acceptable image will typically be recognized as large, solid printed alpha numeric regions on an unprinted background. Further, the edges of the alpha numeric image will be well defined, smooth lines or curves. Once an acceptable image file is present, the user proceeds to the next decision box.

Alternatively, a user may programmatically generate character files using the make character function. A collection of character files is stored in compressed form in a library. A different library may be formed for each complete set of images. From the compressed character files in a library, the makestring function combines a particular selected set of files to form a string of characters. For example, if a desired image string were "ABC"; the makestring function would first obtain the file for "A", second, the function would obtain the file for "B", third, the function would obtain the file for "C"; fourth, the function would append the files together; and fifth, the function would store the appended file as a 1-bit Sun raster file.

Next, a user may check the image for acceptable size. If unacceptable, the user can use the scale function to increase the size or decrease the size of that image. For example, if an image corresponding to the Statute of Liberty had been scanned in, the image size might be acceptable in shape but unacceptably small, for example only half the desired size. The user could double the image size using the scaling function. Once the scaling function is used, a new 1-bit Sun raster file is formed.

The next step is to combine a character string and another image using the merge function. For example, the Statute of Liberty file might be combined with a character string file for a vehicle identification number, the two initial files and the final file being 1-bit Sun raster files. Additional files may be subsequently added one at a time or three or four images can be combined in one operation.

Once a desired combined image file is formed, the file may be printed. Any 1-bit Sun raster file may be accepted by the print function and sent to a Versatec printer interface. Those skilled in the art will recognize that raw raster files could alternatively be sent to other types of printer interfaces having the capability of accepting raw raster data and driving raster printers. The print function may also take a number of print files and sequentially send them to the printer.

A more detailed description of the particular functions of the preferred program, with reference to FIGS. 7 through 14, follows.

Figure 7:
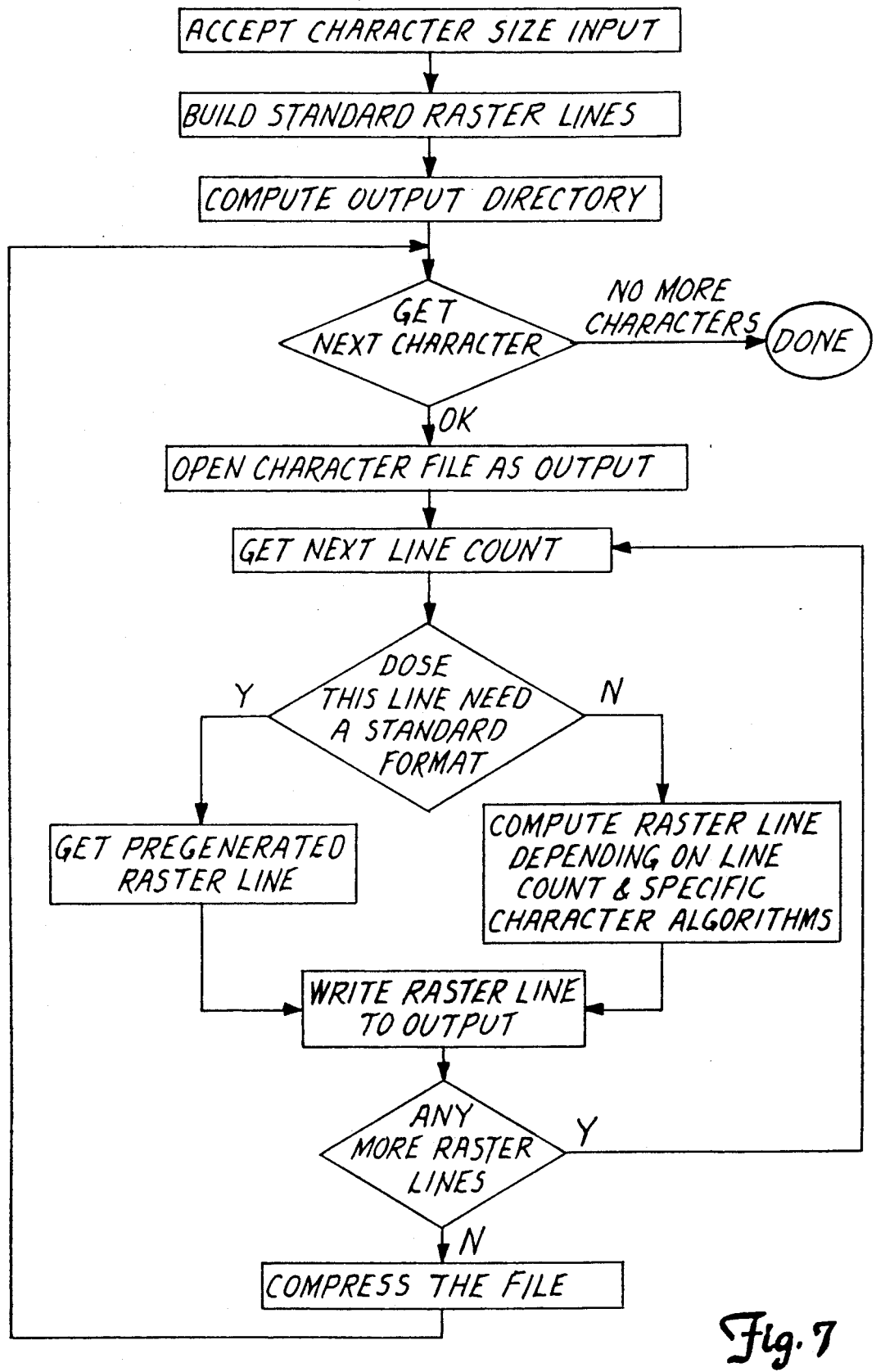
FIG. 7 is an illustration of the make character function of the program.

As shown in the flow chart of FIG. 7, the make character function of the program allows a user to programmatically prepare files for specific images. For example, in the case of vehicle identification numbers for license plates, a user may wish to prepare a set of alpha numeric characters.

A graphical user interface is displayed upon the computer screen to assist and prompt the user for this and other functions. The user first selects or accepts an appropriate character size input. The make character function of the program accepts the character size input and next allows programming of a group of standard raster lines that are repeated as portions of characters within a set of characters. The make character function also designates a "library" or directory for storage of the character files being prepared. Next, the program proceeds to prompt for the next character to be prepared. For a set of alpha numeric characters, the process is repeated 36 times, once for each numeral and letter. For each character, each raster line must be checked. The next line count allows the progressive advancing to the next raster line of the character file. For example, a 3 inch (7.6 cm) high character file at a resolution of 200 dots per inch, has about 600 raster lines, corresponding to about 600 horizontal lines.

If a particular raster line corresponds to a portion of the character that may be present in a repetitive or standard format, then that standard format is used. For example, a letter "I" has two cross or horizontal bars connected by an upright or vertical bar. In the region of the upright bar, each raster line includes a portion or line segment of the upright bar. Thus, each raster line going through the upright bar uses the standard pregenerated raster line segment to reduce the programming effort required for the character file "I". Similarly, standard raster line segments may be prepared for the two cross bars. Next, the user decides whether any more raster lines are needed to prepare the file. For example, if line number 300 has been written and the same line will be repeated until line 600, we go get the next line.

An alternative logic route is followed when a standard line is not appropriate. For example, in the case of the curves in the letter "C". The program calculates where the printed portion would appear for each raster line, depending upon the size of the characters to be printed.

Typically, character files are not long, although the more complex alpha numeric characters i.e. "S", "2" and "5" tend to be relatively large. Specific program steps or lines are provided in the accompanying microfiche.

One of the final operations of the make character function is to compress the file. Compression of files serves to reduce the total amount of data in the file and more efficiently uses memory as well as speeding data retrieval in later functions.

Figure 8:
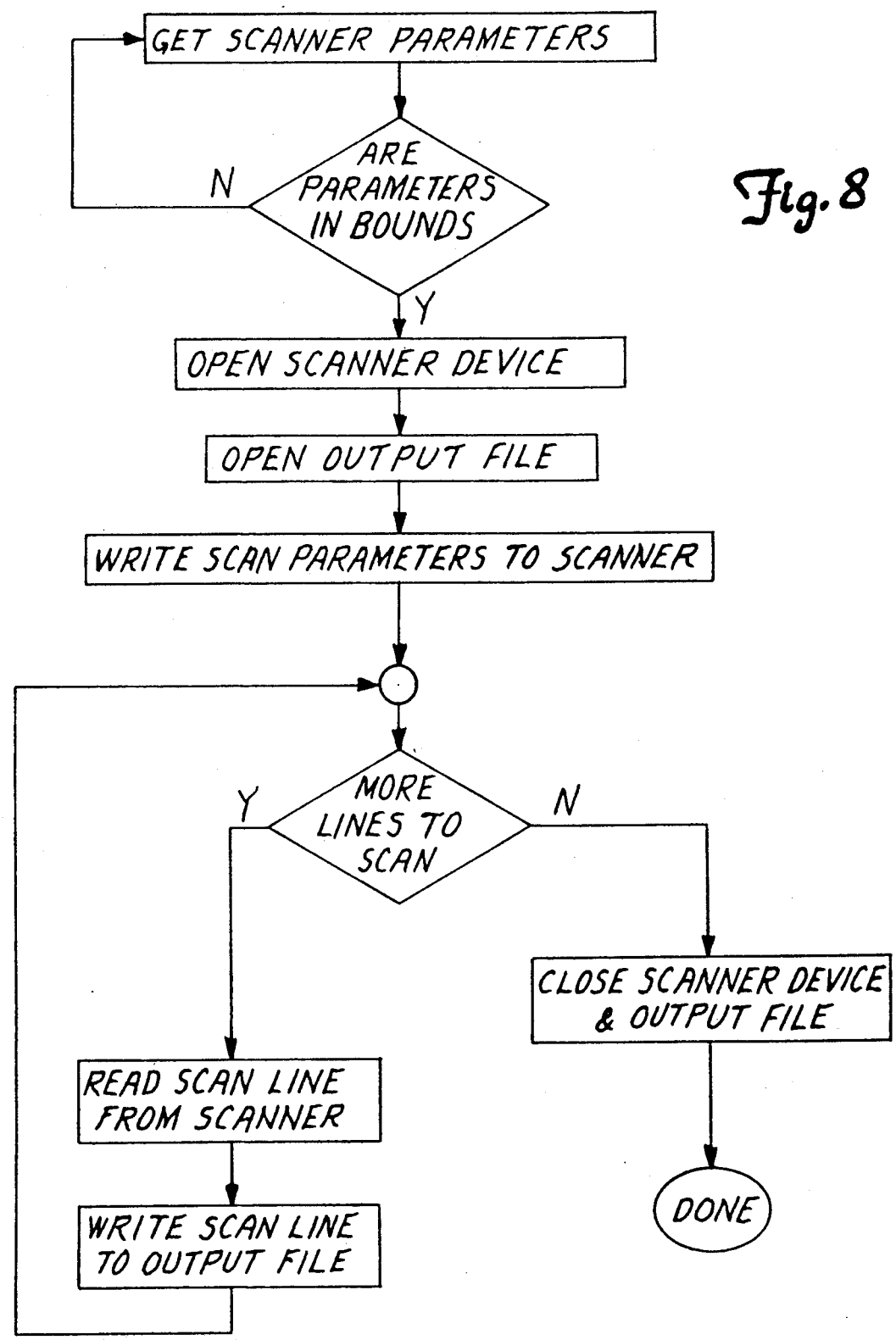
FIG. 8 is an illustration of the scan function of the program.

The logic of the scan function is shown in FIG. 8. Again the scan function causes the display of a user interface screen to prompt and assist the user. The scan function first accepts a set of scanner parameters regarding the size of the image. The scan function verifies that the selected parameters are such that the scanner can supply the number of lines corresponding to the lines specified by the parameters. Parameters exceeding the accepted boundaries are rejected and the user prompted to supply appropriate parameters. Next, a communication line to the scanner is opened and an output file opened to accept the data. For example, a Howtec scanner is capable of the following resolution possibilities: 75 dots per inch, 100 dots per inch, 150 dots per inch, 200 dots per inch and 300 dots per inch.

The scanner then provides information on a line by line basis corresponding to the eye readable image being scanned. The information, on a line by line basis is written to the output file. The resulting scan data is in 8-bit format, in order to include grey scale information for each pixel or dot. If an image was scanned at a resolution of 300 dots per inch in 10 inches, that would entail 3,000 lines and 3,000 repetitions of the logic loop. Finally, the scanner device and the output file would be closed.

Figure 9:
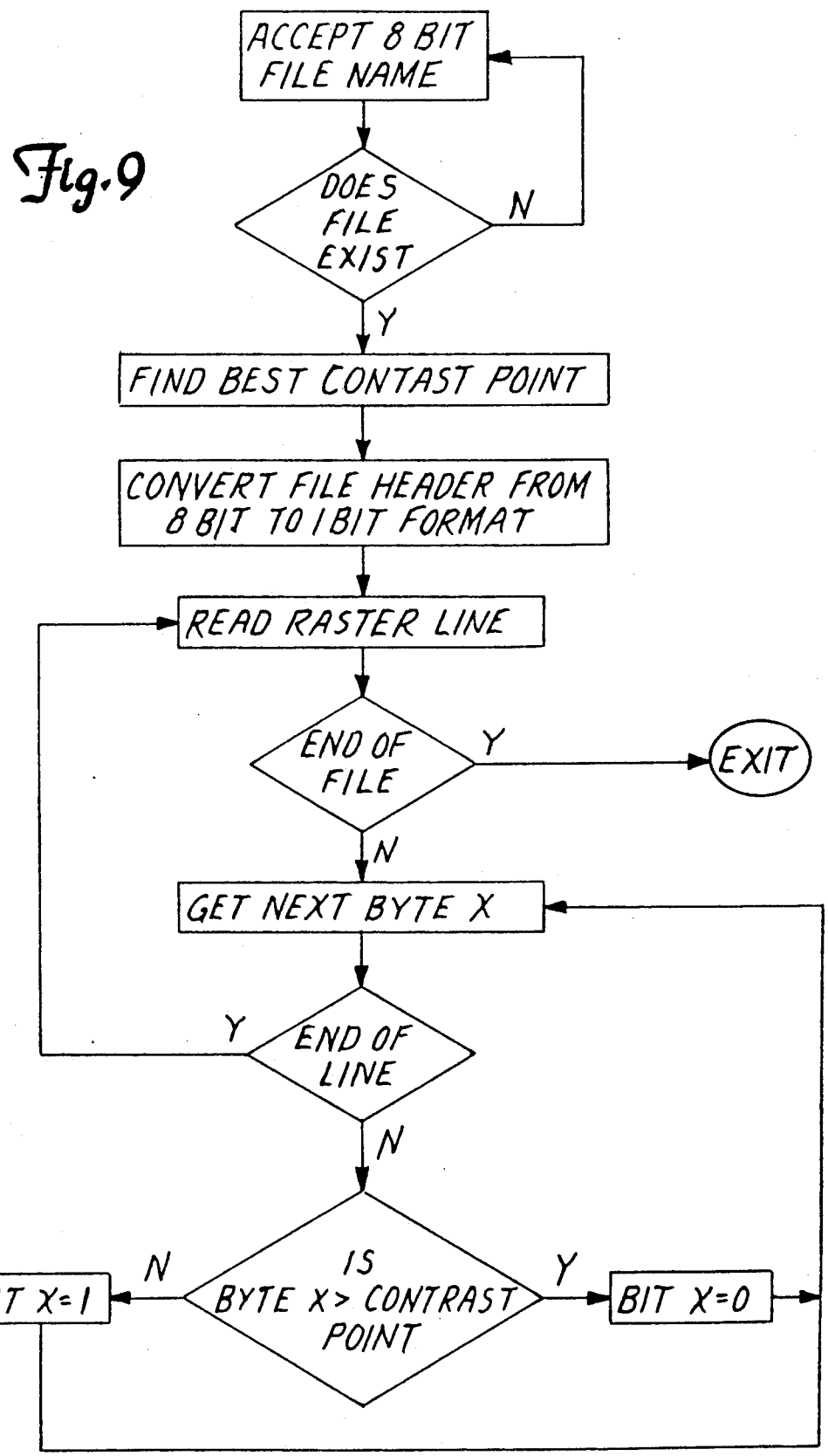
FIG. 9 is an illustration of the contrast function of the program.

As shown in FIG. 9, the contrast function is used to convert the grey scale 8-bit image information from the scanner to a black and white (print/no print) system more suitable for a reflective sign. A user interface screen from the contrast function prompts for a file name. If the file exists, the program retrieves it and proceeds. The function first assists the user in selecting the best contrast point, i.e. a particular number between 0 and 255 which serves as the best arbitrary division between grey scale values which will be considered black and grey scale values which will be considered white. Generally, the best contrast point is found from the distribution curve of frequency of occurrences plotted against grey scale value. On such a distribution curve, the best contrast point is a minimum (preferably the deepest minimum) located between a pair of maximums (as opposed to a minimum at one end of the grey scale.)

After selecting the best contrast point, the file is converted by changing the data from an 8-bit file header to 1-bit file header. Effectively, the conversion divides the total file length by 8 and changes the grey scale tones to black or white. Each raster line is read until we find the end of file. If 600 raster lines are used, the process is repeated 600 times. Within the data, each byte representing grey scale information greater than the contrast point is set to 0. Bytes less than the contrast point are set to 1. (Note that the 1-bit raster format has 0 equal to white and an 8-bit raster format has 0 equal to black.) Once the end of each raster line is reached, the next raster line is started until all the data has been processed, then the file is closed.

Figure 10:
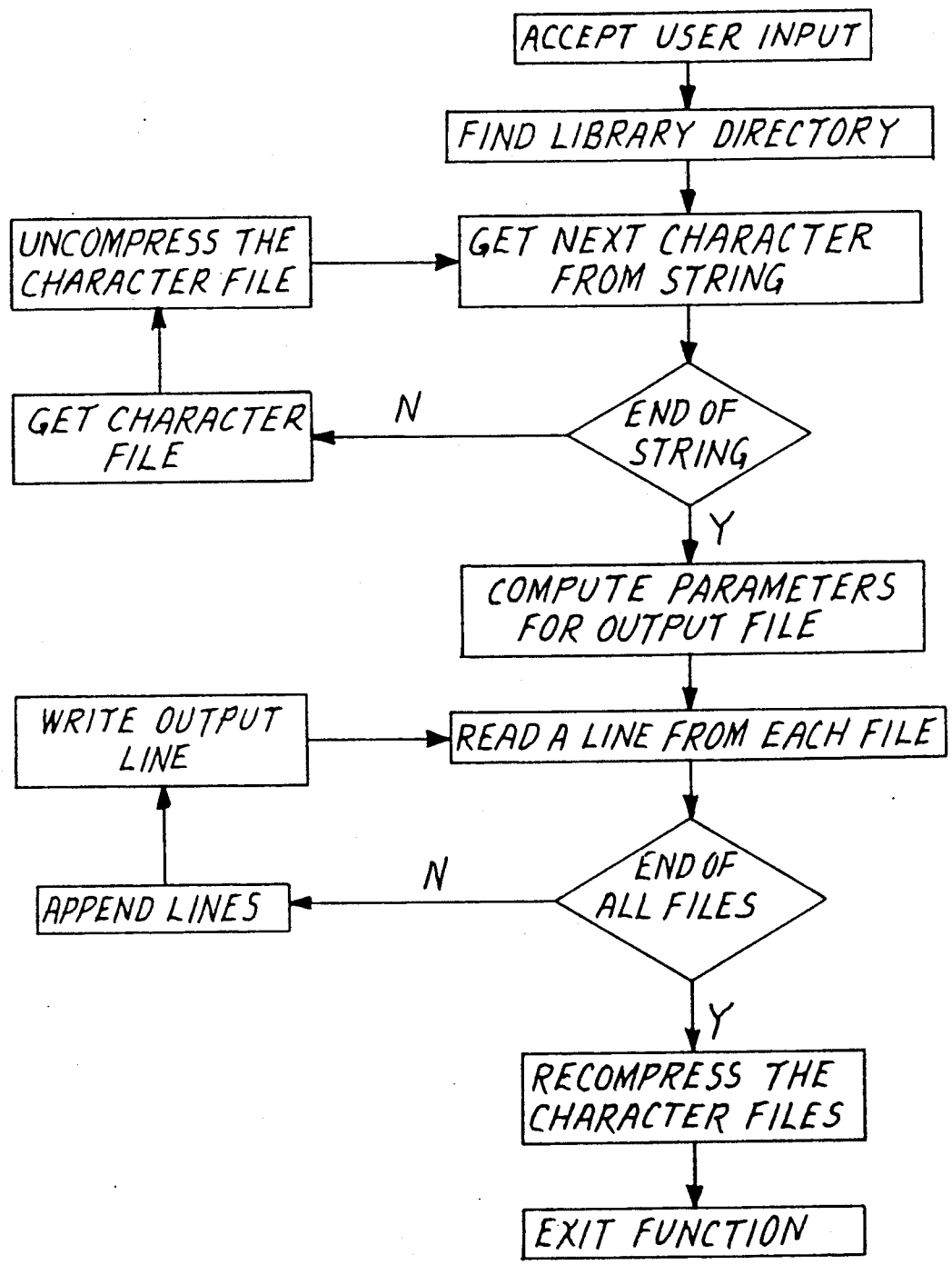
FIG. 10 is an illustration of the make string function of the program.

As shown in FIG. 10, the makestring function initially prompts and accepts user input consisting of a string of characters and a character type, corresponding to a predefined library. For example, for a 7 digit license plate for the U.S. displaying six characters and one blank, the preferred characters are about 3 inches high by about 1.25 inches wide (i.e. 7.6 cm×3.2 cm).

The file for each selected character is retrieved and uncompressed to provide a 1-bit raster format. The parameters of the output file are computed next. This entails adding the widths of all the character files together and then combining the width times the height of the character. For example, for a license plate having six letters each of image size 3 inches (7.6 cm) high by 1.25 inches (3.2 cm) wide the file must accommodate about 900,000 dots (i.e. 1.25 inches/letter×6 letters×200 dots per inch)×(3 inches/letter×200 lines/inch). The files are combined by first reading a line from each file. Each of these lines should be the same number of lines down from the top of the image. The lines are next appended to form a single line. The process eventually results in a set of 600 output lines. The output lines are then written to an output file. Finally, the output file is compressed and sent to the library.

Figure 11:
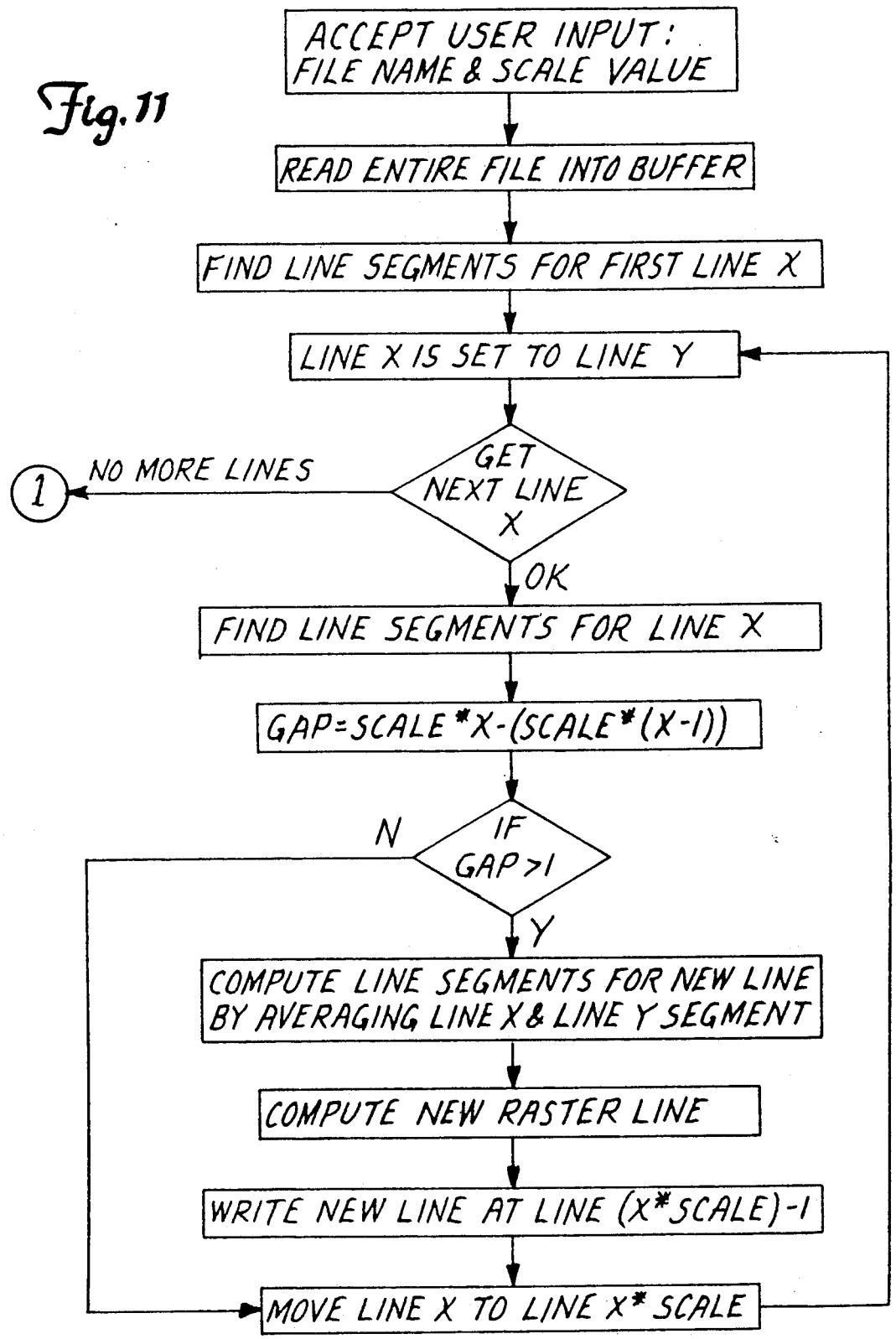
FIG. 11 is an illustration of a portion of the scale function of the program.
Figure 12:
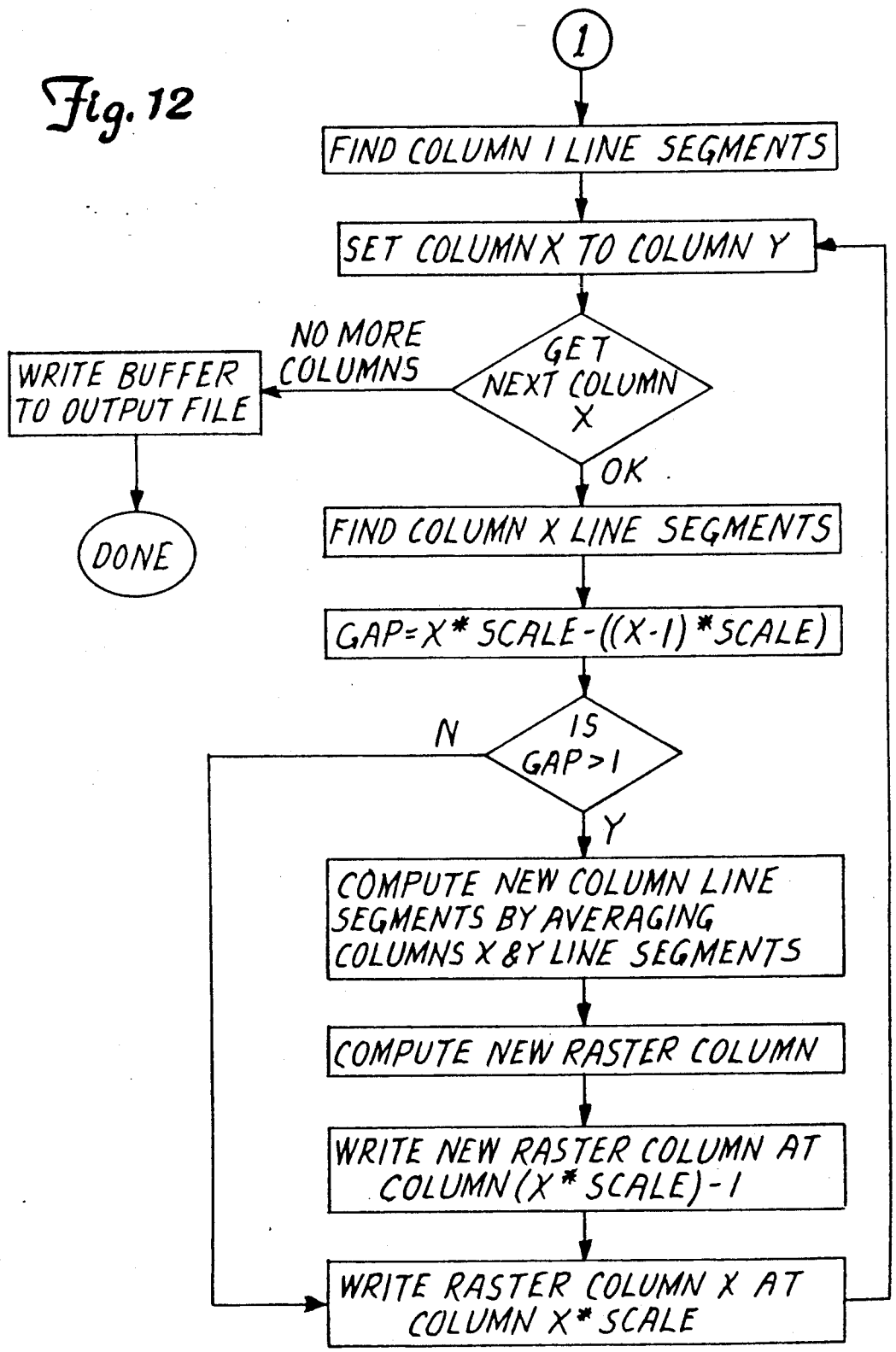
FIG. 12 is an illustration of a second portion of the scale function of the program.

As shown in FIGS. 11 and 12, the scale function is best explained as a two part function. In the first part, shown in FIG. 11, the vertical dimension of the image is expanded or contracted by adding or subtracting raster lines. In the second part, the horizontal dimension of the image is expanded or contracted by adding or subtracting data from each raster line.

As shown in FIG. 11, a user first instructs or inputs the file name and scale value. The scale value may be any value from 0 to 2.0 in increments of one-tenths. The scale value of 2.0 means that the image will be doubled on in both width and height and therefore the resulting image will be four times the area of the initial image. Conversely if a scale factor of 0.5 is chosen the resulting image will be half as high and half as wide and the area will be one-quarter of the original. For clarity of explanation, the process will be explained for a scale factor of 2.0 (i.e. a doubling of image height and width.)

Next, the initial file is read entirely into the buffer. The initial file is treated as a two dimensional array of lines and height. The algorithm begins by finding the line segments for the first line. This first line is temporarily named "y" or "previous line". The next line is found and temporarily named "x" or "current line". The two lines are evaluated in order to calculate a line which will be inserted between the previous and current lines and thereby begin to double the image height. Beginning points of line segments, (i.e. portions which will be printed) are averaged to determine a beginning line segment point for the new line. Similarly, ending points are averaged to determine an ending point for the new line segment. For example, if a beginning point of line y is at raster No. 232, and the beginning point of line x is at raster No. 234, then the line segment in the new line begins at raster dot 233. If the end point of line y is at 555 and the end point of line x is at 575, then the new line segment end point is at 565. Next, the points between the beginning and the end of the new line segment are filled with "ones", such that those points will be printed as a black line segment. For some lines there may be multiple line segments, however all of the line segments in lines x and y that match or are partially overlapping are treated in the above manner.

The result is a newly calculated line inserted between the line y, which is on the top, and line x, on the bottom, and an image having increased height. To continue, a newer line must be calculated for insertion between the current line and the next successive line of the original image. For scale factors between 1.0 and 2.0, proportionately fewer insertions of newly calculated lines are made. For scale factors less than 1.0, a proportionate number of lines are deleted and no new lines need be calculated.

In the second part of the scale function, as shown in FIG. 12, the length of the line segments to print will be increased or decreased. Each pixel or dot is treated as a member of a vertical column. Vertical columns are calculated and inserted to expand the image or alternatively deleted to reduce the image based upon the scale factors used in the first part of the scale function.

The completed image file resulting from the scale function is in 1-bit Sun raster format and is written to a new file. The new 1-bit Sun raster file can be merged, scaled or printed.

Figure 13:
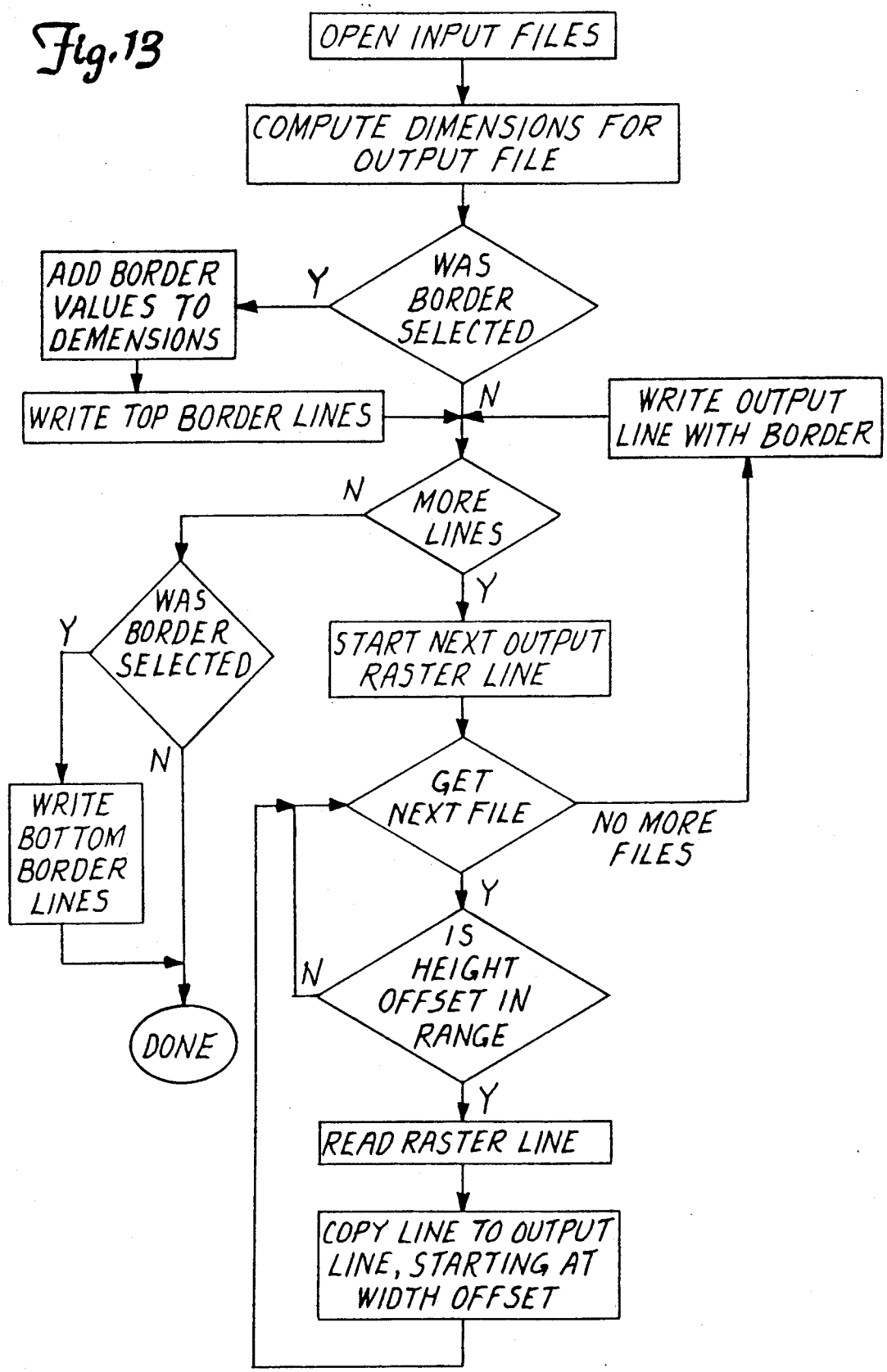
FIG. 13 is an illustration of the merge function of the program.

As shown in FIG. 13, the merge function allows a user to combine a plurality of image files into a single file. The user begins by identifying the files desired to be merged together and entering the file names. Next, the function computes the dimensions for the file which will be output based upon the dimensional parameters of the files to be merged. If an unprinted border is desired, the border values are added to the file dimensions and the top border lines written to the new file. Next, the function determines whether there are more lines to combine. Subsequently, a raster line of each file is combined into a single new raster line and written to the new file. Finally, a bottom border may be added.

Figure 14:
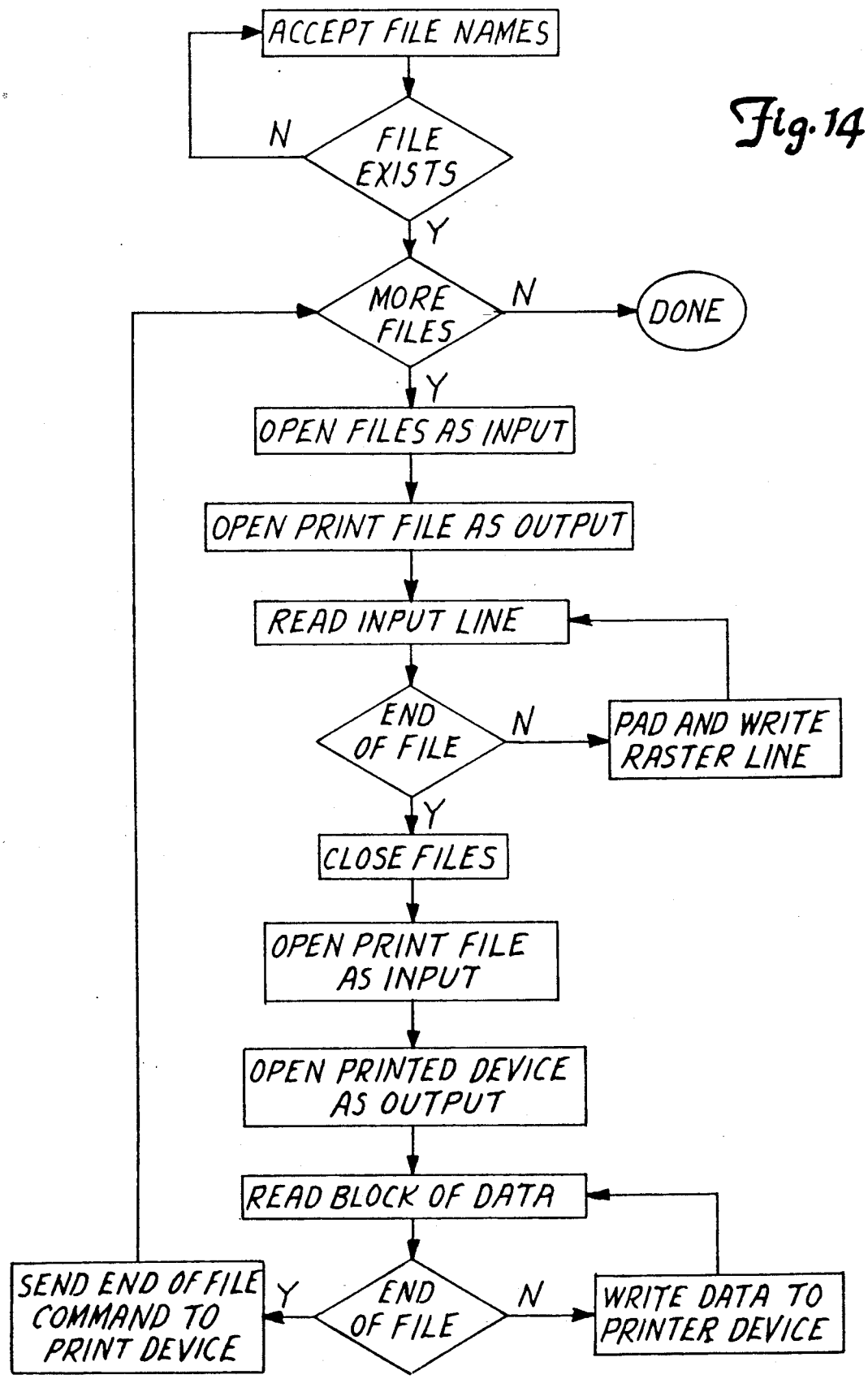
FIG. 14 is an illustration of the print function of the program.

The print function as shown in FIG. 14, begins by accepting the file names of the files to be printed. If the file does not exist, the user is notified and requested to enter another file name. This function is designed to sequentially print multiple files and produce prompts for additional files. When all the files to be printed have been identified, the function proceeds to open an input file and to open a print file, specifically, a 1-bit raw raster file. (A 1-bit raw raster file is shown in the data flow diagram of FIG. 5 as a circle.) Next, an input line from the input file is read. The input line is padded or truncated, if necessary, to assure that the line will contain exactly 400 bytes of information. Next, the input file and output 1-bit raw raster file are closed. Immediately following that, the 1-bit raw raster print file is reopened as an input file and the printer device (a Versatec printer interface) is opened as output. A block of data is read from the input file. The block may be of any size, however, it is preferred that the entire file is used as a single unit. Once the data has been read into the buffer, the data is written to the printer. At the end of the file, an end of file command is sent to the printer device and the next file to print is found.

In summary, the computer program of the present invention includes a number of program steps which, in combination, perform the major functions of the program. Specifically, the program includes: a function for making a character which may be used as an image or a portion of an image; a function for scanning in eye readable images; a function for adjusting contrast from grey scale to black and white; a function for adjusting scale or size of the image definition; a function for assembling the individual characters into a string; a function for merging an image definition with a second preferably repetitive image; and a function for sending the image definition to a printer.

EXAMPLE 1

A mixture was prepared of 88% Acryloid B-66 binder resin (Rohm & Haas Company), 4% TRIBLOX PC-100 charge carrier (DuPont Company) and 8% carbon black (Regal 500R from Cabot Corporation). The components were mixed in a Baker Perkins gear drive variable speed twin screw extruder with a Haake rheocord torque rheometer and extruded as a mixture at a temperature range between 150° C. to 225° C. The extruded mixture was hammer milled, and subsequently jet milled in a NPK supersonic jetmill model PJM IDS-2 from Nippon Pneumatic Manufacturing Company. The jet milled sample was then classified to collect material having a particle size range from 5 to 20 micrometers. This material was placed in the toner hopper of a 3M brand MODEL 1800 MULTIFUNCTION PRINTER. A computer program (appended) digitally defining alphanumeric images 7.0 cm in height as raster files was used to print upon REFLECTO-LITE retroreflective sheeting. The printer applied toner powder to the defined images. Subsequent to printing the toner was fused in the printer. The toner adhered well to the sheeting.

EXAMPLE 2

A mixture was prepared of 88% Acryloid B-66 binder resin (copolymer of methyl and butyl methacrylates from Rohm & Haas Company), 2.3% Nigrosine Solvent Black 7, CI#50415:1 (Bontron N-01 from Orient Chemical Company) and 8% carbon black (Regal 500R from Cabot Corporation). The components were mixed and processed as described in example 1. After classifying and collecting, this toner was tested using a 3M brand MODEL 1800 MULTIFUNCTION PRINTER following the procedure given in example 1.

EXAMPLE 3

The retroreflective sheeting and fused image from Example 1 was first exposed to corona treatment (see U.S. Pat. No. 4,844,976, column 9) and then laminated to an ethylene acrylic acid (EAA) transparent cover film at a temperature of 150° C. and a nip roll pressure of 19 kg/cm of width. Both the retroreflective sheeting and the EAA were drawn past a corona treater for exposure to about 2.4 kw per meter of width to promote lamination adhesion. The alpha numeric image was sandwiched between the retroreflective sheeting and the transparent EAA cover film. Because the EAA film tends to lack adequate dimensional stability, a polyester carrier web was initially employed to provide dimensional stability to the EAA film. The carrier web was recovered after passage through the nip. The EAA adhered well to the layers below. The printed alpha numeric image was apparent through the transparent cover film. The laminate, including the sandwiched image, was applied to an aluminum license plate blank to form a completed license plate.

EXAMPLE 4

An embossed aluminum licence plate blank including a REFLECTO-LITE retroreflective sheeting layer was printed with the dry toner powder of Example 1 as follows: a portion of the dry toner powder was spread on a surface and a hand-held hard rubber roller was rolled over the toner to load the surface of the roller with toner. Next the roller was rolled over the raised portions of the embossed plate which had been slightly warmed. The powder transferred to the raised portions, adhering to the raised portions of the polyvinyl butyral surface. Next, the plate was heated to fuse the powder. The black printed image was clearly visible on the lighter colored retroreflective sheeting and corresponded to the raised image.

The combination of the reflective sheeting surfaces listed above with the solid toners described is unique, as is the use of an electrophotographic printing process to make a sign such as a license plate. The toners described are solid and capable of working in the electrophotographic process, adhering well to the reflective sheeting surface. The inventive process decreases air pollution from solvent vapors which are released from liquid inks and eliminates the investment in drying ovens and solvent recovery equipment that are associated with liquid ink processes.

Although the present invention has been described with reference to the preferred embodiments, workers skilled in the art will recognize that changes may be made in form and detail without departing from the spirit and scope of the invention.

What is claimed is:

1. A reflective sign comprising a retroreflective sheet:
   A. having an image bearing surface, intended to be seen by an observer, which comprises a polymer selected from the group consisting of polyalkylacrylates, polyalkylmethacrylates, polyesters, vinyl polymers, polyurethanes, cellulose esters, fluoropolymers, polycarbonates, polyolefins, polyvinyl acetals, ionomeric copolymers and copolymers of ethylene or propylene with acrylic acid, methacrylic acid, or vinyl acetate;
   B. said image bearing surface having printed thereon an image derived from a solid toner comprising:
      (1) a colorant;
      (2) a transparent polymeric binding agent, which adheres to said image bearing surface, selected from the group consisting of alkyl substituted acrylic and methacrylate polymers with alkyl groups having 1-9 carbon atoms, polyvinyl acetals, polyolefins, polyesters and vinyl resins; and
      (3) a charge carrier selected from the group consisting of:
         acrylic polymers with functional groups having at least an amine nitrogen or quaternary ammonium nitrogen;
         methacrylic polymers with functional groups having at least an amine nitrogen or quaternary ammonium nitrogen; and
         azine dyes.

2. The sign of claim 1, wherein the printed image is light transmissive.

3. The sign of claim 1 wherein the binding agent consists of a copolymer of methyl methacrylate and butyl methacrylate.

4. The sign of claim 1 which further comprises: a supporting substrate to which the reflective sheet is adhered.

5. The sign of claim 4 wherein the supporting substrate comprises a material selected from the group consisting of aluminum, steel, and polymeric materials.

6. The sign of claim 1 further comprising: a light transmitting protective top layer covering the reflective sheet layer and the fused toner so as to place the image between the reflective sheet layer and the transparent top layer.

7. The sign of claim 1 and further comprising: an embossed area on which the image derived from solid toner has been printed.

* * * * *

UNITED STATES PATENT AND TRADEMARK OFFICE
CERTIFICATE OF CORRECTION

PATENT NO.   :   5,085,918
DATED        :   February 4, 1992
INVENTOR(S)  :   J. Sundar Rajan It is certified that error appears in the above-indentified patent and that said Letters Patent is hereby corrected as shown below:

On title page, item [19], "Rajan et al." should read —Rajan—

Item [75] Inventors: "J. Sundar Rajan; Vincent J. Mako" should read —J. Sundar Rajan, of St. Paul, Minn.—

Signed and Sealed this

Twentieth Day of December, 1994

Attest:

BRUCE LEHMAN

*Attesting Officer*          *Commissioner of Patents and Trademarks*